United States Patent
Kassab et al.

(10) Patent No.: US 7,355,804 B1
(45) Date of Patent: Apr. 8, 2008

(54) DISK DRIVE PARTIALLY AUTONOMOUS PREAMPLIFIER FOR WRITE CURRENT PARAMETERS

(75) Inventors: Roger Kassab, Shrewsbury, MA (US); Richard E. Olsen, Framingham, MA (US)

(73) Assignee: Maxtor Corporation, Longmont, CO (US)

( * ) Notice: Subject to any disclaimer, the term of this patent is extended or adjusted under 35 U.S.C. 154(b) by 184 days.

(21) Appl. No.: 11/143,323

(22) Filed: Jun. 2, 2005

Related U.S. Application Data (60) Provisional application No. 60/599,669, filed on Aug. 6, 2004.

(51) Int. Cl.
*G11B 5/09* (2006.01)

(52) U.S. Cl. .......................................... 360/46; 360/68

(58) Field of Classification Search ...................... None
See application file for complete search history.

(56) References Cited

U.S. PATENT DOCUMENTS

| | | | | |
|---|---|---|---|---|
| 5,408,365 A | * | 4/1995 | Van Doorn et al. | 360/46 |
| 6,104,565 A | | 8/2000 | Bruner et al. | 360/69 |
| 6,301,068 B1 | * | 10/2001 | Ionescu | 360/68 |
| 6,967,797 B2 | * | 11/2005 | Sako | 360/46 |
| 7,023,641 B2 | * | 4/2006 | Doi et al. | 360/68 |
| 7,027,251 B1 | * | 4/2006 | Darragh et al. | 360/75 |
| 7,095,576 B2 | * | 8/2006 | Kim et al. | 360/46 |
| 7,126,778 B2 | * | 10/2006 | Lamberts | 360/69 |
| 2002/0141094 A1 | * | 10/2002 | Suzuki et al. | 360/68 |
| 2003/0223143 A1 | * | 12/2003 | Fujiwara et al. | 360/68 |
| 2005/0094300 A1 | * | 5/2005 | Yano et al. | 360/31 |
| 2005/0207296 A1 | * | 9/2005 | Silva | 369/47.36 |
| 2006/0001994 A1 | * | 1/2006 | Williams | 360/31 |
| 2006/0221487 A1 | * | 10/2006 | Hidaka | 360/75 |

\* cited by examiner

*Primary Examiner*—Fred F. Tzeng
*Assistant Examiner*—Dan I Davidson
(74) *Attorney, Agent, or Firm*—Myers Bigel Sibley & Sajovec, P.A.

(57) ABSTRACT

A disk drive includes a rotatable data storage disk, and head, a controller, and a preamplifier. The head is configured to write data to and read data from the disk. The controller is configured to generate a write current command. The preamplifier includes a plurality of write current parameters, and is configured to select among the plurality of write current parameters based on the write current command from the controller, and to generate a write current having a shape that varies based on which of the write current parameters are selected. The write current is provided to the head to write a plurality of data bits on the disk.

16 Claims, 6 Drawing Sheets

| Bits | 7 | 6 | 5 | 4 | 3 | 2 | 1 | 0 |
|---|---|---|---|---|---|---|---|---|
| Load_Cur | 1 | 0 | 1 | 0 | 0 | 1 | 1 | 0 |
| Counter | 255 | 223 | 191 | 159 | 127 | 95 | 63 | 31 |
| Counter match load | 255 |  | 191 |  |  | 95 | 63 |  |
| Pointer | NEXTWCUR4 |  | NEXTWCUR3 |  |  | NEXTWCUR2 | NEXTWCUR1 |  |

FIG. 7

| NEXTWCUR1 | WCO (3 bits) | WCA (5 bits) |
|---|---|---|
| NEXTWCUR2 | WCO (3 bits) | WCA (5 bits) |
| NEXTWCUR3 | WCO (3 bits) | WCA (5 bits) |
| NEXTWCUR4 | WCO (3 bits) | WCA (5 bits) |
| Counter | 8 bits |  |
| Load_Cur | 8 bits |  |

DISK DRIVE PARTIALLY AUTONOMOUS PREAMPLIFIER FOR WRITE CURRENT PARAMETERS

RELATED APPLICATION

This application claims the benefit of and priority to U.S. Provisional Patent Application No. 60/599,669, filed Aug. 6, 2004, the disclosure of which is hereby incorporated herein by reference as if set forth in its entirety.

FIELD OF THE INVENTION

The present invention generally relates to digital data storage devices and, more particularly, to a disk drive and related methods for varying write current parameters that are used to write data on a disk.

BACKGROUND OF THE INVENTION

Figure 1:
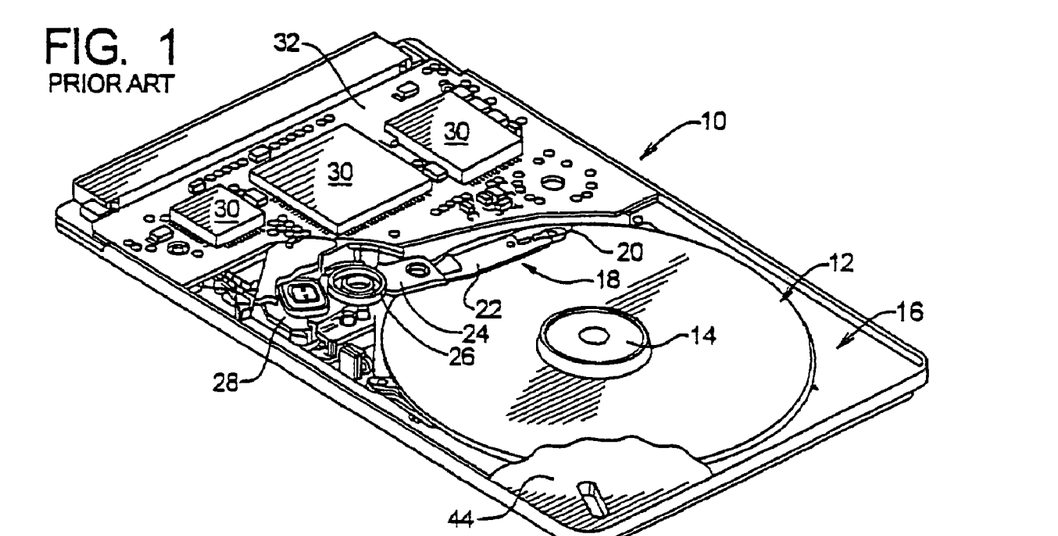
FIG. 1 is a perspective view of a conventional disk drive.

A simplified diagrammatic representation of a disk drive, generally designated as 10, is illustrated in FIG. 1. The disk drive 10 includes a data storage disk 12 that is rotated by a spindle motor 14. The spindle motor 14 is mounted to a base plate 16. An actuator arm assembly 18 is also mounted to the base plate 16.

The actuator arm assembly 18 includes a head 20 (or transducer) mounted to a flexure arm 22 which is attached to an actuator arm 24 that can rotate about a pivot bearing assembly 26. The actuator arm assembly 18 also includes a voice coil motor (VCM) 28 which moves the head 20 relative to the disk 12. The spin motor 14, and actuator arm assembly 18 are coupled to a number of electronic circuits 30 mounted to a printed circuit board 32. The electronic circuits 30 can include, for example, a digital signal processor (DSP), a microprocessor-based controller and a random access memory (RAM) device.

Figure 2:
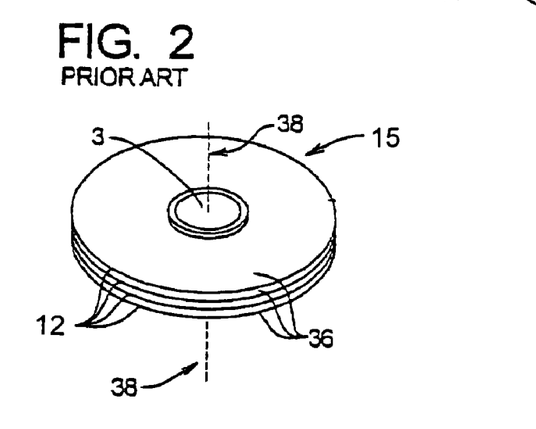
FIG. 2 is a perspective view of a conventional disk stack having a plurality of disks.

Although a single disk 12 is illustrated in FIG. 1, the disk drive 10 may instead include a plurality of disks. For example, FIG. 2 illustrates a disk stack 15 that includes a plurality of disks 12, each of which may have a pair of data storage surfaces 36. The disks 12 are mounted on a cylindrical shaft and are designed to rotate about axis 38. The spin motor 14 as mentioned above, rotates the disk stack 15.

Figure 3:
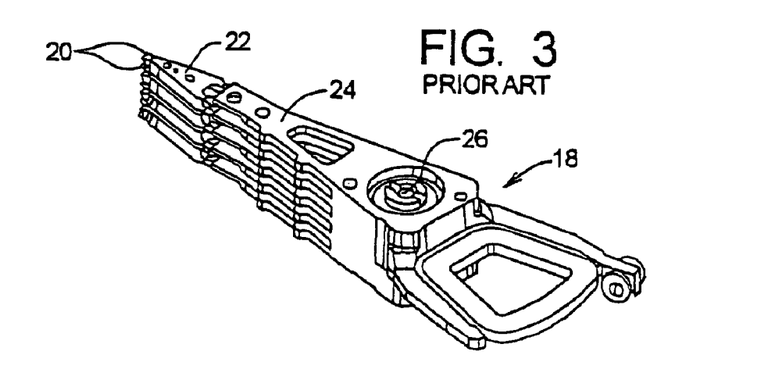
FIG. 3 is a perspective view of a portion of an actuator arm assembly having a plurality of actuator arms.

Referring now to the illustration of FIGS. 1-3, the actuator arm assembly 18 includes a plurality of heads 20, each of which correspond to one of the disk surfaces 36. Each head 20 is mounted to a corresponding flexure arm 22 which is attached to a corresponding portion of the actuator arm 24 that can rotate about the pivot bearing assembly 26. The VCM 28 operates to move the actuator arm 24, and thus moves the heads 20 relative to their respective disk surfaces 36. The heads 20 are configured to fly adjacent to the disk surfaces 36 on air bearings.

Figure 4:
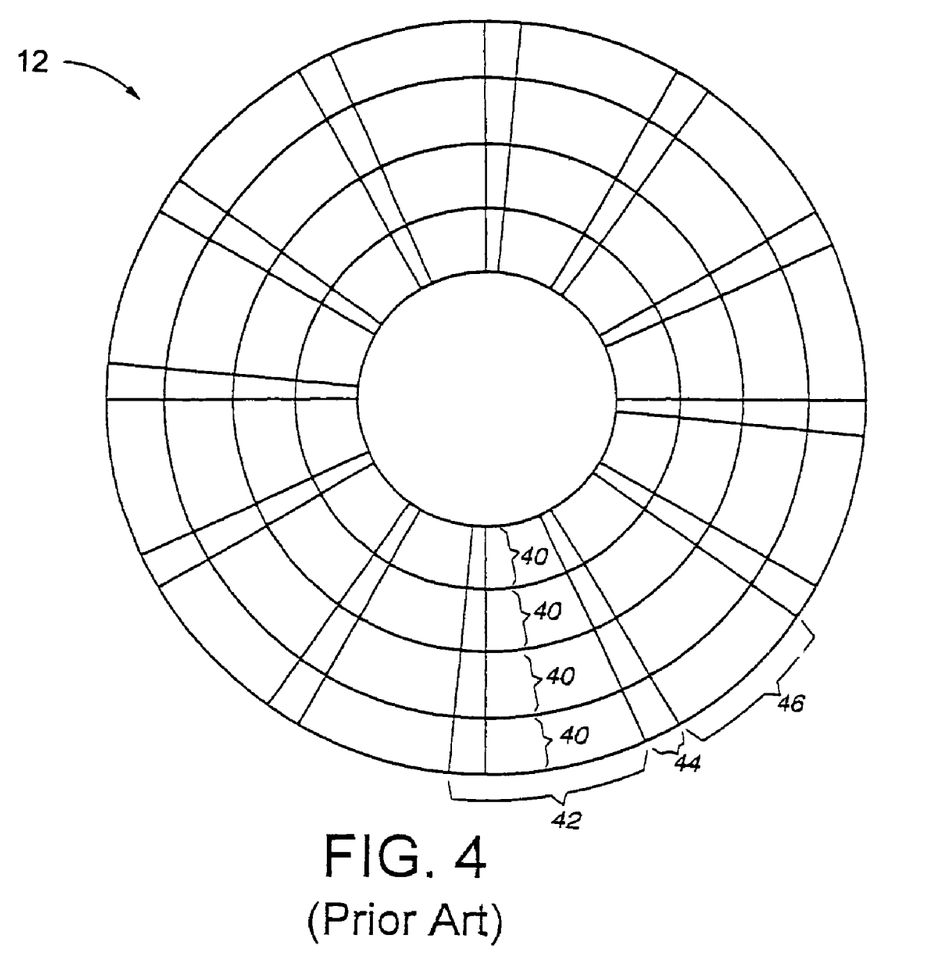
FIG. 4 is a top view of a conventional disk and illustrates tracks and sectors, with each of the sectors being divided into a servo sector and a data sector.

FIG. 4 further illustrates one of the disks 12. Data is stored on the disk 12 within a number of concentric tracks 40 (or cylinders). Each track is divided into a plurality of radially extending sectors 42 on the disk 12. Each sector 42 is further divided into a servo sector 44 and a data sector 46. The servo sectors 44 of the disk 34 are used to, among other things, accurately position the head 20 so that data can be properly written onto and read from the disk 12. The data sectors 46 are where non-servo related data (i.e., user data) is stored and retrieved. Such data, upon proper conditions, may be overwritten.

To accurately write data to and read data from the data sectors 46 of the disk 12, it is desirable to maintain the head 20 at a relatively fixed position with respect to a centerline of a designated track 40 during writing and reading operations (called a track following operation). To assist in controlling the position of the head 20 relative to the tracks 40, the servo sectors 44 contain, among other things, servo information in the form of servo burst patterns that include one or more groups of servo bursts, as is well-known in the art.

Data is written on the disk 12 by the electronic circuits 30 generating a write current that is conducted through a coil in the head 20. In response to the write current, the head 20 generates a magnetic flux that writes (i.e., sets) a magnetic state of an adjacent area of the surface 36 of the disk 12. The direction of the write current is switched to cause a corresponding change in the written magnetic state. The parameters of the write current can also be controlled to avoid excessive heating of the head 20, which may cause undesirable contact between the head 20 and the disk 12. With the trend toward writing data at increasingly high data rates and with decreased gap between the head 20 and disk 12, it may become increasingly important to provide higher rates of control of the write current parameters so as to compensate for rapid variations in, for example, head temperature.

SUMMARY OF THE INVENTION

Some embodiments of the present invention provide a disk drive that includes a rotatable data storage disk, and head, a controller, and a preamplifier. The head is configured to write data to and read data from the disk. The controller is configured to generate a write current command. The preamplifier includes a plurality of write current parameters, and is configured to select among the plurality of write current parameters based on the write current command from the controller, and to generate a write current having a shape that varies based on which of the write current parameters are selected. The write current is provided to the head to write a plurality of data bits on the disk.

In some further embodiments of the present invention, the preamplifier responds to individual write current commands from the controller to sequentially vary the shape of the write current through at least two different shapes, and to maintain the write current at each of the at least two different shapes for a sufficient amount of time to write a plurality of data bits through the head to the disk. Accordingly, the preamplifier can vary the shape of the write current in a partially autonomous manner. When the preamplifier changes the shape of the write current it may change, for example, magnitude of the write current, amount of overshoot of a leading edge of the write current beyond a defined magnitude, and/or width of the overshoot of the leading edge of the write current beyond the defined magnitude.

In some further embodiments of the present invention, the controller can be configured to generate a write gate command. The preamplifier can be configured to respond to heating of the head based on the write gate command, and to vary the shape of the write current to compensate for the heating effects of the write current on the head. More particularly, the preamplifier can generate an indication of an amount of heating of the head based on the write gate command, and to select among the write current parameters based on the generated indication of the amount of heating of the head. The preamplifier may generate the write current with an initial shape in response to the write current command from the controller, and may then change the shape of the write current based on the generated indication of the amount of heating of the head.

In some further embodiments of the present invention, the preamplifier can be configured to count changes in the write gate command and to generate a count value based thereon, and to sequence through the plurality of write current parameters based on the count value. The preamplifier can include a plurality of registers, a selector, and a write current adjuster. Each of the registers can be configured to store one of the write current parameters. The selector can be configured to sequentially select among the registers based on the count value. The write current adjuster can be configured to change the shape of the write current based on the write current parameter of the register selected by the selector.

In some further embodiments of the present invention, the preamplifier can include an integrator that is configured to integrate values of the write gate command over time and to generate an integration value based thereon. The preamplifier can be configured to select among the plurality of write current parameters based on the integration value.

The preamplifier can be configured to generate the write current with an initial shape in response to a command from the controller, and to change the shape of the write current in response to an increase in the integration value. The integrator can include a lossy voltage integrator that is configured to integrate voltage values of the write gate command over time, and to vary a contribution of the voltage values to the integration value based on recency of the voltage values to a present time.

In some further embodiments of the present invention, the preamplifier can be configured to measure a rate of switching of the polarity of the write current between two opposite directions, and to select among the plurality of write current parameters based on the write gate command and the measured switching rate. The preamplifier can be configured to select a first write current parameter in response to a command from the controller and to generate the write current with a first magnitude based on the selected first write current parameter, and to select a second write current parameter based on the write gate command and to change the shape of the write current based on the selected second write current parameter. The preamplifier can cease the write current based on an associated indication by the write gate command, and is configured to change the shape of the write current in response to ceasing the write current.

Some other embodiments of the present invention provide a method of generating a write current from a preamplifier in a disk drive having a rotatable data storage disk, a head, and a controller. A write current command is received at the preamplifier from the controller. Sequential selections are made among a plurality of write current parameters based on the write current command. A write current is generated from the preamplifier that has a shape that varies based on which of the write current parameters are selected. Data is written on the disk through the head based on the write current from the preamplifier

DETAILED DESCRIPTION OF THE INVENTION

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items. In the drawings, the size and relative sizes of regions may be exaggerated for clarity.

Some embodiments of the present invention provide disk drives and methods. Accordingly, the present invention may be embodied in hardware and/or in software (including firmware, resident software, micro-code, etc.). Consequently, as used herein, the term "signal" may take the form of a continuous waveform and/or discrete value(s), such as digital value(s) in a memory or register. Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The present invention is described below with reference to block diagrams, including operational flow charts, of disk drives and methods according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 5:
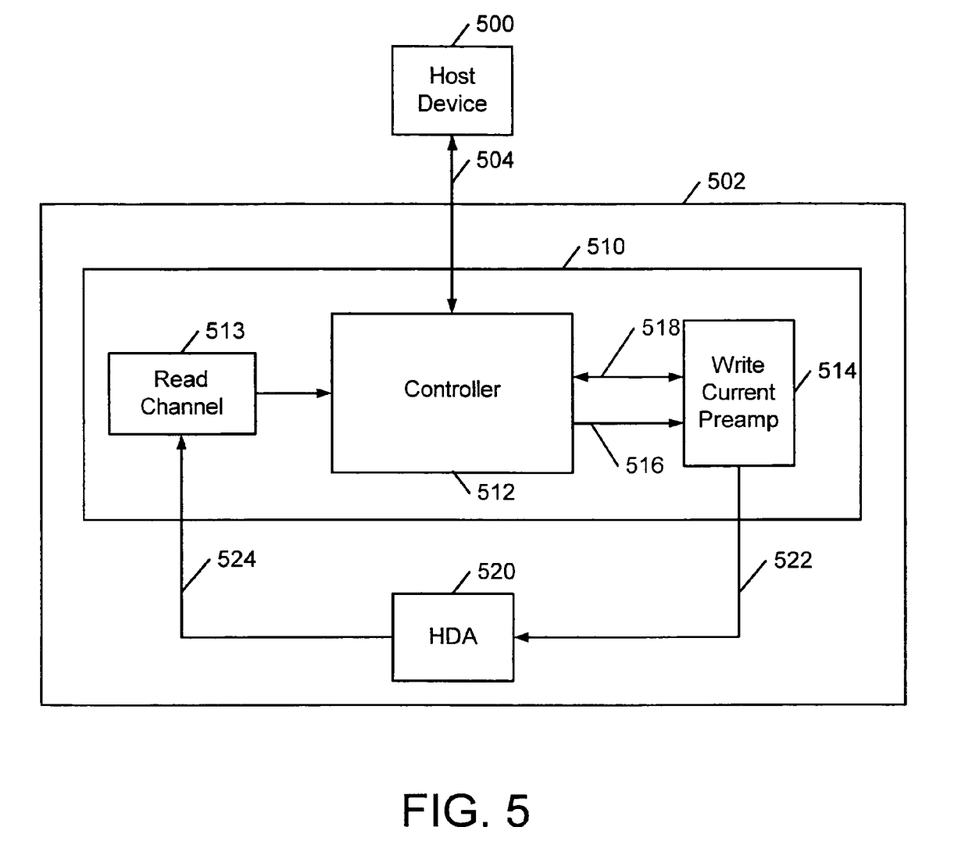
FIG. 5 is a block diagram of a host device that is connected to a disk drive that is configured in accordance with various embodiments of the present invention.

FIG. 5 is a block diagram of a host device 500 that is connected to a disk drive 502, which may be configured as was described for the disk drive 10 of FIG. 1, and which is configured to vary the magnitude of the write current in accordance with various embodiments of the present invention. Data 504 can be transferred from the host device 500 to the disk drive 502 for storage, and can be retrieved from the disk drive 502 and transferred to the host device 500. The disk drive 502 includes drive electronic circuits 510, which can include the electronic circuits 30 of FIG. 1, and a head disk assembly 520 ("HDA"), which can include the disk(s) 12, actuator assembly 18, voice coil motor 28, spin motor 14, and head(s) 20 of FIG. 1.

The electronic circuits 510 can include a controller 512, a read channel 513, and a write current preamplifier 514. The controller 512 can include a data controller and a servo controller which may reside in one or more integrated circuits.

The read channel 513 includes a read element in the head 20 and an amplifier, and can operate in a conventional manner to convert data from the analog read signal 524 from the read element in the head 20 to the digital form used by the controller 512. The head 20 generates the read signal 524 based on servo information (including preamble and servo burst patterns) and data on the disk 12. The controller 512 uses the servo information in the read signal 524 to perform seek and track following operations of the head 20 relative to the data tracks 40. The controller 512 communicates the data in the read signal 524 to the host device 500.

The controller 512 formats data that is to be written on the disk 12, and provides a representative data signal 516 to the preamplifier 514 for writing on the disk 12. In response to the data signal 516, the preamplifier 514 generates a write current 522 that is provided to, for example, a coil in the head 20 to generate a magnetic flux that writes the corresponding data to the disk 12.

According to embodiments of the present invention, the preamplifier 514 includes a plurality of write current parameters, and changes the parameters to effect a change in the shape of the write current 522 that it generates in a partially autonomous manner, based on a write current command 518 from the controller 512 and based on autonomous decisions by the preamplifier 514. More particularly, the preamplifier 514 can select among the plurality of write current parameters based on the write current command 518 from the controller 512 for the parameter(s) that are to be used generate the write current 522. By changing the parameters that are used to generate the write current 522, the preamplifier 514 can change the shape of the write current 522 in an autonomous manner. As used herein, the "shape" of the write current 522 that is controlled by the preamplifier 514 can include, but is not limited to, magnitude of the write current 518, amount of overshoot of a leading edge of the generated write current 518 beyond a defined magnitude, and/or width of the overshoot of the leading edge of the generated write current 518 beyond the defined magnitude.

Although the write current command 518 is illustrated as a single path, it is to be understood that the write current command 518 can include a plurality of separate commands that may be communicated between the controller 512 and preamplifier 514 via a plurality of dedicated or time-multiplexed conductive paths. As will be explained below, the write current command 518 can include a write gate command.

In some embodiments of the present invention, the controller 512 uses the write current command 518 to setup an initial shape of the write current 522 that is to be generated by the preamplifier 514. The preamplifier 514 can then, for example, vary the shape of the write current 522 to compensate for heating effects on the head 20. Accordingly, in response to individual write current commands 518, the preamplifier 514 can sequentially vary the magnitude, amount of overshoot, and/or width of overshoot of the write current 522 through at least two different levels, and to maintain the write current at each of the levels for a sufficient amount of time to write a plurality of data bits through the head 20 to the disk 12. As will be explained in further detail below, the preamplifier 514 can be configured to respond to heating of the head 20. The preamplifier 514 can then decrease the write current 522 from an initial magnitude based on the heating in order to, for example, avoid distortion of the head 20 (e.g., pole tip protrusion) that can cause undesirable contact of the head 20 with the disk 12.

Figure 6:
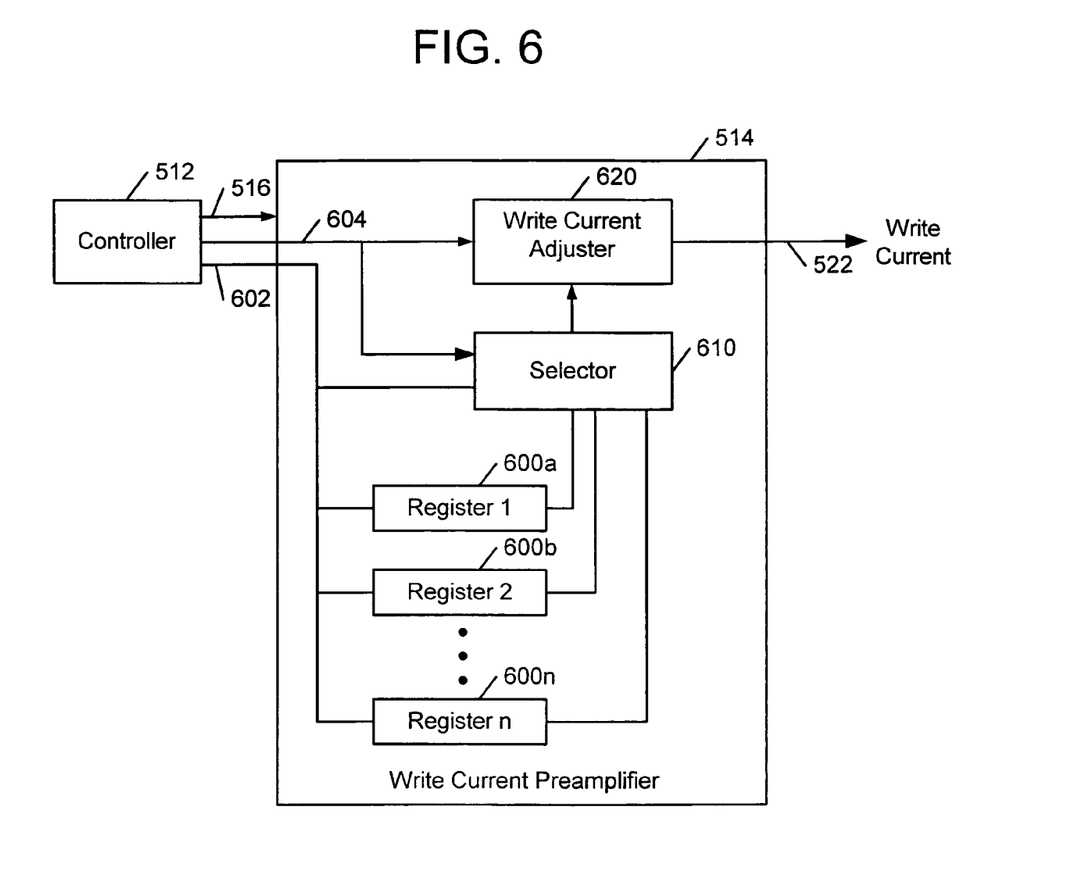
FIG. 6 is a block diagram of a preamplifier in accordance with some embodiments of the present invention.

Referring to FIG. 6, the preamplifier 514 is configured to vary the shape of the write current based on a write current command 602 and a write gate command 604. The write current command 602 and write gate command 604 may be collectively referred to as the write current command 518 illustrated in FIG. 5. The write gate command 604 is communicated by the controller 512 to cause the preamplifier 514 to cease the write current 522, so as to, for example, prevent erasure of servo bursts in the servo sectors 44. More particularly, the controller 512 can include several timers, one of which can be a pre-servo timer. The pre-servo timer "times out" prior to the head 20 reaching the servo sectors 44 and generates the write gate command 604 that prevents writing on the disk 12, and it can also generate other signals in a conventional manner, including, for example, a search signal to enable a burst demodulation circuit in the controller 512 to begin searching for a sync pulse within the servo sector 44.

The preamplifier 514 can use the write gate command 604 to respond to heating of the head 20. The temperature of the head 20 depends, in part, on the shape of the write current 522 and a number of blocks of data that are written to the disk 12 without a break of sufficient length to allow the head 20 to sufficiently cool. Consequently, the head 20 may not become overheated while writing a few number of blocks of data if the magnitude of the write current 522 were held constant, but it may become overheated while writing a larger number of blocks of data. To avoid overheating of the head 20, the preamplifier 514 can use the write gate command 604 to estimate the amount of data being written, and, thereby how much the head 20 is being heated. More particularly, and as will be described below, the preamplifier 514 can count the number of write gate commands 604 to determine an amount of heating of the head 20, and can vary the shape of the write current 522 based on the counted write gate commands 604. The preamplifier 514 may thereby lower, for example, the magnitude, amount of overshoot, and/or width of overshoot of the write current 522 when longer data writes are indicated by the count, so as to compensate for heating of the head 20 (e.g., to avoid overheating of the head 20). The preamplifier 514 may also wait until receipt of the write gate command 604 before changing the shape of the write current 522, so as to avoid changing the write current 522 shape while data is being written on the disk 12.

The preamplifier 514 can also revert back to previous write current parameters as the head 20 cools, such as in response to idle periods between writing data. The preamplifier 514 may also revert back to an initial write current parameter when the head 20 is idle for a duration that is sufficient for the head 20 to have returned below a threshold temperature, or when the disk drive 10 selects another head 20 for accessing a different disk surface in the disk stack 15.

With further reference to FIG. 6, the preamplifier 514 can include a plurality (n) of registers 600a-n, a selector 610, and a write current adjuster 620. The registers 600a-n are each configured to store a write current parameter. The controller 512 may set the write current parameters in the registers 600a-n through the write current command 602, and/or it may define which of the write current parameters in the registers 600a-n are to be used by the preamplifier 514 to adjust the shape of the write current 522. The selector 610 is configured to select among the registers 600a-n. For example, the selector 610 can be configured to count changes in the write gate command 604 and to generate a count value therefrom. The selector 610 can then select among (e.g., sequence through) the registers 600a-n based on the count value. The write current adjuster 620 is configured to adjust the shape of the write current 522 based on the write current parameters selected by the selector 610 in the registers 600a-n. Accordingly, the number and particular write current parameters may be defined to provide a desired shape of the write current 522. The controller 512 can reset the count value of the selector 610 via the command 602, such as in response to an event that has been or will be expected to allow a threshold amount of cooling of the head 20 (e.g., a long seek command, switching between heads 20 to write on another disk within the disk stack 15, and/or a sufficient break between write commands).

In one exemplary embodiment, the write current adjuster 620 generates the write current 522 with an initial shape based on the write current parameter in register 600a, and then change the write current 522 shape by sequencing through the write current parameters in registers 600b-n as various count thresholds of the write gate command 604 are reached. The magnitude, amount of overshoot, and/or width of overshoot of the write current 522 can thereby be decreased in, for example, a stair-step manner from initial values. Consequently, the shape of the write current 522 can be changed more over the duration of longer writes and less over the duration of shorter writes so as to compensate for the corresponding heating effects on the head 20.

The preamplifier 514 may also vary the shape of the write current 522 based on the rate at which the polarity of the write current 522 switches between two opposite directions (e.g., duty cycle). Higher switching rates of the write current 522 can cause increased heating of the head 20. The selector 610 may determine the rate of switching and sequence through the write current parameters (i.e., sequence through registers 600a-n) based on the determination.

In some embodiments of the present invention, the write current command 602 may be used alone to cause the selector 610 to select among the registers 600a-n and to cause the write current adjuster 620 to vary the magnitude of the write current 522. The length of the write current command 602 may thereby be related to the number of registers 600a-n that need to be separately identified to the selector 610. For example, when the preamplifier contains only two registers (e.g., 600a-b), the write current command 602 may provide a binary or other short indication to the selector 610 to cause a selection between the registers and corresponding change in the magnitude of the write current 522. Accordingly, because the preamplifier 514 has a plurality of write current parameters therein, the communication between the controller 512 and the preamplifier 514 can be simplified (i.e., less bits and/or less frequent communication) when controlling the magnitude of the write current 522.

Reference is now made FIGS. 6 and 7 in which further exemplary embodiments of the present invention will be discussed. The registers 600a-n may be preloaded with the write current parameters and/or the controller 512 may load the registers 600a-n through the write current command 602. The write current parameters are used by the write current adjuster 620 to vary the profile of the write current 522 amplitude (i.e., write current amplitude "WCA") and overshoot (i.e., write current overshoot "WCO") relative to a desired amplitude. The write current parameters also define the count thresholds that the selector 610 uses to determine when and how to sequence through the registers 600a-n. The selector 610 can include an 8 bit counter, and the registers 600a-n can each include 8 bits. One of the registers 600a can store a command from the controller 512 that defines the count thresholds that the selector 610 uses to determine when and how to sequence through the registers 600a-n, and at least some of the other registers 600b-n can be used to store a 5 bit indication of magnitude and a 3 bit indication of amount of overshoot and/or width of overshoot.

Figure 7:
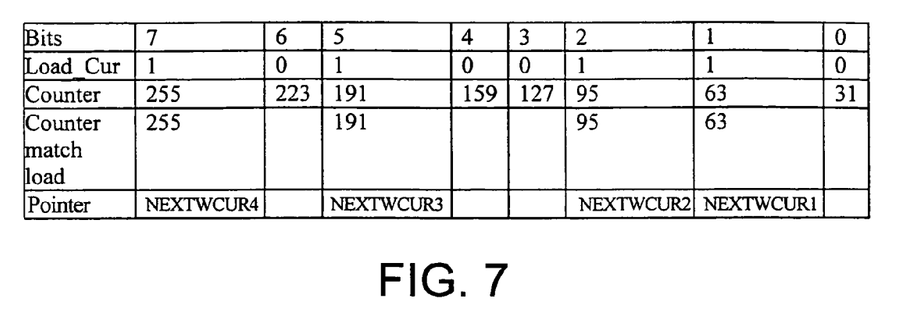
FIG. 7 is a table that illustrates an exemplary relationship that may be used by the preamplifier of FIG. 6 to generate count thresholds for varying write current magnitude based on a current command and write gate commands.

FIG. 7 is a table that illustrates information that the controller 512 may store in various of the registers 600a-n to cause the preamplifier to generate a desired write current 522 profile based the write gate command 604 and defined count thresholds. The controller 512 loads the values of field "load_cur" in one of the registers (e.g., 600a). The selector 610 then applies a predetermined equation to the "load_cur" values to generate count thresholds that it uses to determine when to begin sequencing through the registers 600a-n. The selector 610 may generate the count thresholds that it uses to sequence though the registers 600a-n based on the following exemplary equation:

$$\text{counter match load} = (Bit*32+31)*\text{load\_cur};$$

where "counter match load" is the count threshold, "Bit" is the location within the sequentially numbered step changes in the write current 522 profile, and "load_cur" is either 0 or 1 as explained above.

Accordingly, the write current adjuster 620 may initially generate the write current 522 with an initial shape. Because Bit 0 of "load_cur" is 0, no count threshold is generated. Bit 1 of "load_cur" is 1, and the selector 610 generates a count threshold of 63 (i.e., (1*32+31)*1) is generated. When the count reaches 63, a pointer "NEXTWCUR1" (FIG. 8) is used to retrieve a write current parameter that is used to change the shape of the write current 522. Bit 2 of "load_cur" is 1, and a count threshold of 95 (i.e., (2*32+31)*1) is generated. When the count reaches 95, the pointer "NEXTWCUR2" is used to retrieve the next write current parameter used to change the shape of the write current 522. Bits 3 and 4 of "load_cur" are 0 so no count thresholds are generated therefrom. Bit 5 of "load_cur" is 1, and a count threshold of 191 (i.e., (5*32+31)*1) is generated. When the count reaches 191, the pointer "NEXTWCUR3" is used to retrieve the next write current parameter used to change the shape of the write current 522. Bit 6 of "load_cur" is 0 so no count threshold is generated therefrom. Bit 7 of "load_cur" is 1, and a count threshold of 255 (i.e., (7*32+31)*1) is generated. When the count reaches 255, the pointer "NEXTWCUR4" is used to retrieve the next write current parameter used to define the change the shape of the write current 522.

Accordingly, the selector 610 counts the write gate command 604, and sequences through the registers 600*a-n* as the count thresholds of 63, 95, 191, and 255 are reached. As explained above, the write current adjuster 620 changes the shape of the write current 522 responsive to the write current parameters as each register is selected by the selector 610. As was explained above, the controller 512 can reset the counter in the selector 610 to reset the write current 522 shape to an initial shape. The controller 512 may rewrite the "load_cur" information into the preamplifier 514, without resetting the counter, to cause a change in the shape of the write current 522. As will be appreciated, the count thresholds can be varied using different binary sequences for "load_cur", and/or by defining a different equation/operation in the selector 610 that is used to generate the count thresholds from the "load_cur" information.

Accordingly, the controller 512 can load 8 bits of "load_cur" information into the preamplifier 514, and the preamplifier 514 can then use that information to generate the count thresholds and to change the shape of the write current 522. Consequently, in response to a single command from the controller 512, the preamplifier 514 then changes the shape of the write current 522 in an autonomous manner without being subsequently told when to change the shape of the write current 522.

Figure 8:
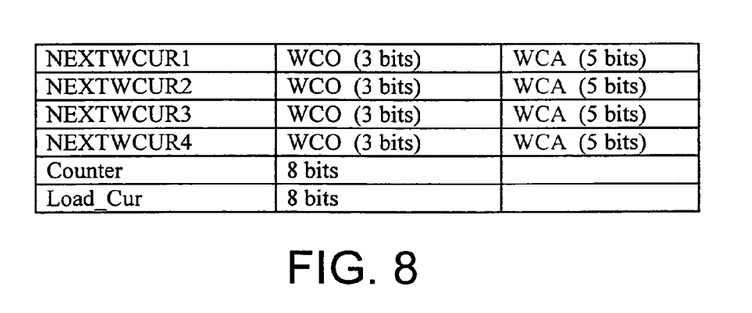
FIG. 8 is a table that illustrates exemplary registers of the preamplifier of FIG. 6 that include write current parameters, a count value, and a current command.

FIG. 8 illustrates an exemplary embodiment of the registers in the preamplifier 514 in which 6 registers, each having 8 bits, are used to store the "load_cur" command, the count value ("counter") generated as the selector 610 counts the write gate command 604, and the four write current parameters ("NEXTWCUR1", "NEXTWCUR2", "NEXTWCUR3", "NEXTWCUR4") that define the write current 522 shapes that are to be sequentially generated by the write current adjuster 620 as the respective registers are selected. The controller 512 can rewrite the "load_cur" register when, for example, a write command is aborted before completing and/or when after writing a portion of data in a write command, an event occurs that allows sufficient cooling of the head 20 such that the magnitude, amount of overshoot, and/or width of overshoot of the write current 522 can be increased (e.g., when switching between heads 20 to write on a different disk in the disk stack 15, and/or when pausing between rewrite of data blocks).

Figure 9:
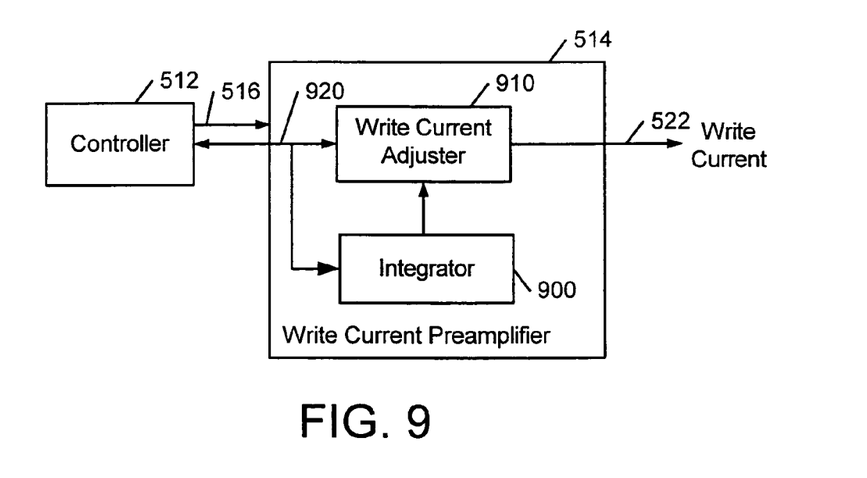
FIG. 9 is a block diagram of a preamplifier in accordance with some other embodiments of the present invention.

FIG. 9 illustrates another exemplary embodiment of the preamplifier 514 that includes an integrator 900 and a write current adjuster 910. The integrator 900 and/or the write current adjuster 910 can include analog and/or digital circuitry. The integrator 900 is configured to integrate values of the write current command 920 over time, and, more particularly, to integrate the write gate command over time, and to generate an integration value based thereon. The write current adjuster 910 selects among a plurality of write current parameters, and generates the write current 522 with a shape that is defined based on the selected write current parameter and the integration value from the integrator 900. For example, the write current parameters can define masks that are selectively applied to the integration value to generate a signal that controls the shape of the generated write current 522.

The integrator 900 can include a lossy voltage integrator that is configured to integrate voltage values of the write gate command over time, and to vary a contribution of the voltage values to the integration value based on recency of the voltage values to a present time. More particularly, the integration value that is generated by the lossy voltage integrator is more influenced by more recent write gate commands 516 and less influenced by less recent commands 516. The lossy voltage integrator may include analog circuitry, such as a resistive capacitive network, and/or operations that are carried out by a microprocessor, and which are configured to vary a contribution of voltage values to the integration value based on recency of the voltage values to a present time.

Figure 10:
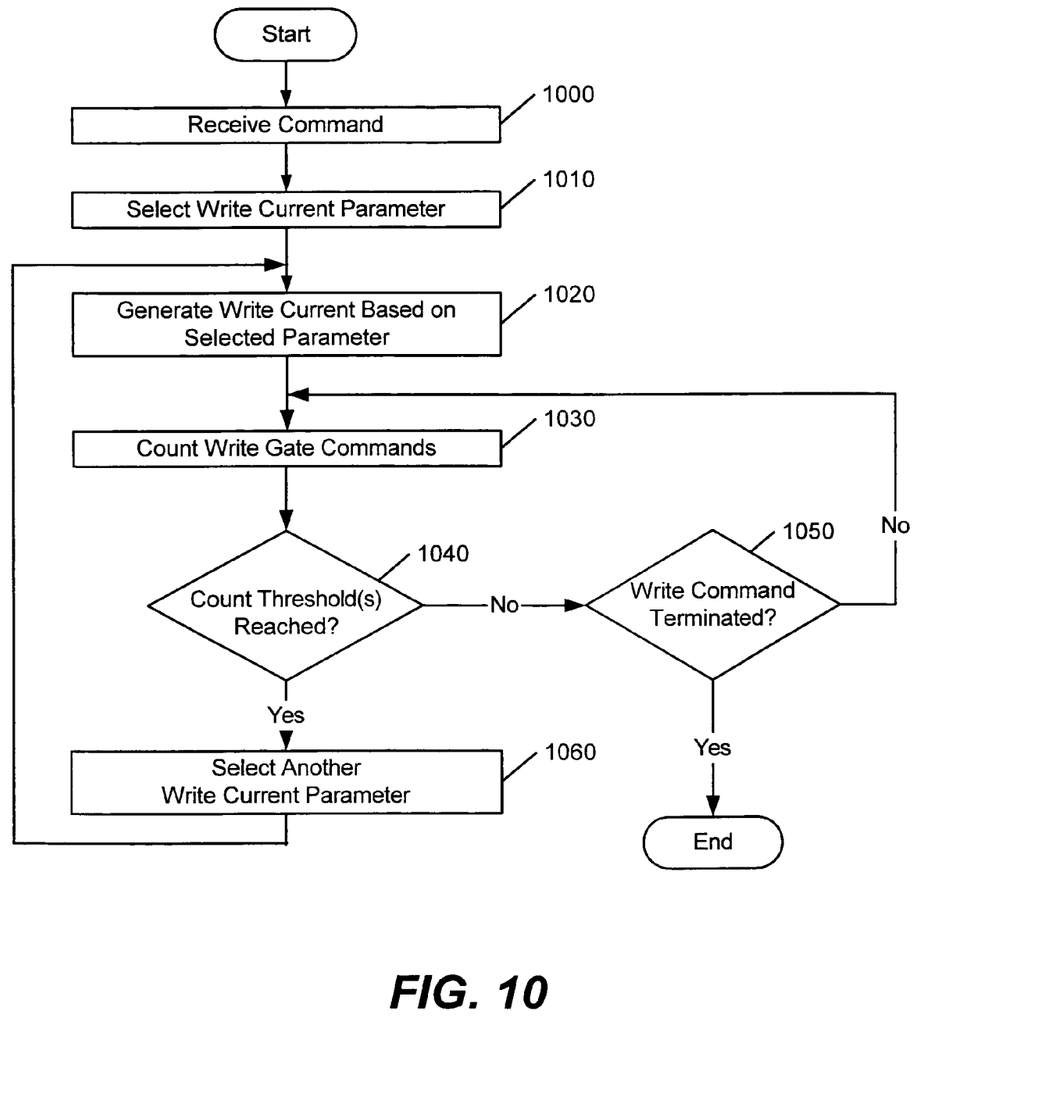
FIG. 10 is a flowchart of operations for generating a write current from a preamplifier in accordance with some embodiments of the present invention.

FIG. 10 is a flowchart of operations that may be carried out by a preamplifier to generate a write current in accordance with some embodiments of the present invention. At Block 1000, a command is received at the preamplifier from a controller. At Block 1010, a write current parameter is selected within the preamplifier based on the command. At Block 1020, a write current is generated having a shape that is defined based on the selected write current parameter. At Block 1030, changes in the write gate commands are counted. At Block 1040, a determination is made as to whether one or more count threshold(s) have been reached. When the count thresholds have not been reached, a further determination may be made at Block 1050 as to whether the present write operation has been terminated. When it hasn't been terminated, then counting of the write gate commands continues at Block 1030. When, at Block 1040, the count threshold(s) have been reached, then at Block 1060, another write current parameter is selected within the preamplifier, and operation returns to Block 1020 to vary the shape of the write current based on the newly selected write current parameter.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A disk drive comprising:
   a rotatable data storage disk;
   a head that is configured to write data to and read data from the disk;
   a controller that is configured to generate a write current command; and
   a preamplifier that comprises a plurality of write current parameters, and that responds to an individual write current command from the controller by selecting among the plurality of write current parameters to sequentially vary the shape of a write current through at least three different shapes and to maintain the write current at each of the at least three shapes for a sufficient amount of time to write a plurality of data bits through the head to the disk.

2. The disk drive of claim 1, wherein the preamplifier responds to the individual write current command from the controller by selecting among the plurality of write current parameters to vary magnitude of the write current, amount of overshoot of a leading edge of the write current beyond a defined magnitude, and/or width of the overshoot of the leading edge of the write current beyond the defined magnitude through at least three different levels and to maintain the write current at each of the at least three levels for a sufficient amount of time to write a plurality of data bits through the head to the disk.

3. A disk drive comprising:
   a rotatable data storage disk;
   a head that is configured to write data to and read data from the disk;
   a controller that is configured to generate a write gate command; and a preamplifier that comprises a plurality of write current parameters, and that is configured to generate an indication of an amount of heating of the head based on the write gate command, to select among the plurality of write current parameters based on the generated indication of the amount of heating of the head, to generate a write current having a shape that varies based on which of the write current parameters are selected, and to provide the write current to the head to write a plurality of data bits on the disk.

4. The disk drive of claim 3, wherein the preamplifier is configured to generate the write current with an initial shape in response to the write gate command from the controller, and to change the shape of the write current based on the generated indication of the amount of heating of the head.

5. A disk drive comprising:
a rotatable data storage disk;
a head that is configured to write data to and read data from the disk;
a controller that is configured to generate a write gate command; and
a preamplifier that comprises a plurality of registers, each of the registers is configured to store one of a plurality of write current parameters, the preamplifier further is configured to generate a write current having a shape that varies based on which of the write current parameters are selected and to provide the write current to the head to write a plurality of data bits on the disk, and wherein the preamplifier is configured to count changes in the write gate command and to generate a count value based thereon, and to sequence through the plurality of write current parameters based on the count value, wherein the preamplifier further comprises
a selector that is configured to select among the registers based on the count value; and
a write current adjuster that is configured to change the shape of the write current based on the write current parameter of the register selected by the selector.

6. A disk drive comprising:
a rotatable data storage disk;
a head that is configured to write data to and read data from the disk;
a controller that is configured to generate a write gate command; and
a preamplifier that comprises a plurality of write current parameters and an integrator that is configured to integrate values of the write gate command over time and to generate an integration value based thereon, the preamplifier is configured to select among the plurality of write current parameters based on the integration value and to generate a write current having a shape that varies based on which of the write current parameters are selected.

7. The disk drive of claim 6, wherein the preamplifier is configured to generate the write current with an initial magnitude in response to the write gate command from the controller, and to decrease the magnitude of the write current in response to an increase in the integration value.

8. The disk drive of claim 6, wherein the integrator comprises a lossy voltage integrator that is configured to integrate voltage values of the write gate command over time, and to vary a contribution of the voltage values to the integration value based on recency of the voltage values to a present time.

9. A disk drive comprising:
a rotatable data storage disk;
a head that is configured to write data to and read data from the disk;
a controller that is configured to generate a write gate command; and
a preamplifier that comprises a plurality of write current parameters, and that is configured to measure a rate of switching of polarity of a write current between two opposite directions, to select among the plurality of write current parameters based on the write gate command and the measured switching rate, and to generate the write current having a shape that varies based on which of the write current parameters are selected.

10. A method of generating a write current, the method comprising:
receiving an individual write current command at a preamplifier;
selecting among a plurality of write current parameters based on the individual write current command;
generating from the preamplifier the write current having a shape that varies based on which of the write current parameters are selected; and
writing a plurality of data bits through a head based on the write current from the preamplifier,
wherein generating from the preamplifier the write current having a shape that varies based on which of the write current parameters are selected, comprises:
sequentially changing the shape of the write current through at least three different shapes; and
maintaining the write current at each of the at least three different shapes for a sufficient amount of time to write a plurality of data bits.

11. A method comprising:
receiving a write gate command at a preamplifier;
integrating values of the write gate command over time to generate an integration value;
selecting among a plurality of write current parameters based on the integration value; and
generating from the preamplifier a write current having a shape that varies based on which of the write current parameters are selected.

12. A circuit comprising:
a preamplifier with a plurality of write current parameters, and that selects among the write current parameters based on a write current command from a controller, that generates a write current having a shape that varies based on which of the write current parameters are selected, and in response to an individual write current command from the controller sequentially varies the shape of the write current through at least three different shapes and maintains the write current at each of the at least three shapes for a sufficient amount of time to write a plurality of data bits through a head to a disk.

13. The circuit of claim 12, wherein the preamplifier, in response to the individual write current command, varies magnitude of the write current, amount of overshoot of a leading edge of the write current beyond a defined magnitude, and/or width of the overshoot of the leading edge of the write current beyond the defined magnitude through at least three different levels and maintains the write current at each of the at least three levels for a sufficient amount of time to write a plurality of data bits through a head to a disk.

14. A circuit comprising:
a preamplifier with a plurality of write current parameters, and that generates an indication of an amount of heating of a head based on a write gate command from a controller, selects among the write current parameters based on the generated indication of the amount of heating of the head, generates a write current having a shape that varies based on which of the write current parameters are selected, and provides the write current to the head to write a plurality of data bits.

15. A circuit comprising:

a preamplifier with a plurality of write current parameters and an integrator that integrates values of a write gate command over time and generates an integration value based thereon, the preamplifier selecting among the write current parameters based on the integration value and generating a write current having a shape that varies based on which of the write current parameters are selected.

16. A circuit comprising:

a preamplifier with a plurality of write current parameters, and that measures a rate of switching of polarity of a write current between two opposite directions, selects among the write current parameters based on a write gate command and the measured switching rate, and generates the write current having a shape that varies based on which of the write current parameters are selected.

* * * * *